United States Patent
Spillinger

[19]

[11] Patent Number: 6,055,622
[45] Date of Patent: *Apr. 25, 2000

[54] GLOBAL STRIDE PREFETCHING APPARATUS AND METHOD FOR A HIGH-PERFORMANCE PROCESSOR

[75] Inventor: Illan Y. Spillinger, Haifa, Israel

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/794,047

[22] Filed: Feb. 3, 1997

[51] Int. Cl.$^7$ ........................................ G06F 12/08
[52] U.S. Cl. ..................... 712/207; 712/225; 711/169; 711/213; 711/217; 711/218; 711/219
[58] Field of Search ..................... 395/383, 566; 711/169, 213, 217, 218, 219; 712/207, 225

[56] References Cited

U.S. PATENT DOCUMENTS

| | | | |
|---|---|---|---|
| 5,357,618 | 10/1994 | Mirza et al. | 395/411 |
| 5,694,568 | 12/1997 | Harrison, III et al. | 395/421.03 |
| 5,752,037 | 5/1998 | Gornish et al. | 395/709 |
| 5,761,706 | 6/1998 | Kessler et al. | 711/118 |

OTHER PUBLICATIONS

Mehrotra, Sharad, "Quantifying the Performance Potential of a Data Prefetch Mechanism for Pointer–Intensive and Numeric Programs," CSRD and UI Department of Computer Science, (Nov. 7, 1995) pp. 1–34.

Chen, Tien–Fu and Baer, Jean–Loup, "Effective Hardware–Based Data Prefetching for High–Performance Processors", IEEE Transactions on Computers, vol. 44, No. 5 (May 1995) pp. 609–623.

*Primary Examiner*—Zarni Maung
*Assistant Examiner*—Saleh Najjar
*Attorney, Agent, or Firm*—Blakely, Sokoloff, Taylor & Zafman LLP

[57] ABSTRACT

A method and hardware apparatus for data prefetching. In one embodiment, the method of the present invention comprises first calculating a local stride value by computing the value between two address references of a first load instruction. The local stride value of the first load instruction is used as a global stride value for address prefetching for a second load instruction, where the second load instruction is different from the first load instruction. An appropriate global stride value is added to a previous address value associated with a previous occurrence of the second load instruction, producing an address location for prefetching a block of data.

13 Claims, 3 Drawing Sheets

GLOBAL STRIDE PREFETCHING APPARATUS AND METHOD FOR A HIGH-PERFORMANCE PROCESSOR

RELATED APPLICATIONS

This application is related to Ser. No. 08/771,705 filed Dec. 20, 1996, entitled "A Mechanism for Prefetching Targets of Memory De-Reference Operations in a High-Performance Processor", now U.S. Pat. No. 5,822,788 assigned to the assignee of the present invention.

FIELD OF THE INVENTION

The present invention is related to the field of microprocessors. More specifically, the invention relates to data prefetching mechanisms which improve data access in a high-performance microprocessor.

BACKGROUND OF THE INVENTION

Pointer de-referencing has become a prevalent subject in today's software languages such as C++ and other object-oriented languages. The clear trend is to produce code in which structures are created dynamically. This has generated a problem of how to efficiently handle pointer de-reference operations at the microarchitectural level of a computer system. Prior approaches to solving this problem have attempted to enhance performance by focusing on improved data prefetching schemes.

Data prefetching is a subject that has been extensively explored recently as a way to improve processor performance. The basic idea behind prefetching is to load data references from external memory into an on-chip cache so that the memory latency is hidden. When data references are available in a local cache memory of the processor, program execution proceeds smoothly and rapidly. However, if data is not resident in the on-chip data cache, the processor must perform a bus cycle to access memory. This means that all of the dependent operations usually must have their execution postponed until the required data is returned from memory. Hence, prefetching is aimed at bringing data into a local cache to the processor prior to the time the data is actually needed.

Both hardware and software-based data prefetching schemes have been tried or proposed for reducing the stall time in a processor caused by memory latency. For example, an article entitled, "Effective Hardware-Based Data Prefetching for High-Performance Processors," by Tien-Fu Chen, et al. (IEEE 1995) describes a hardware-based prefetching mechanism that tracks data access patterns in a reference prediction table. Utilizing the history of previous code, the table is constructed based on addresses generated in prior iterations of an instruction pointer. Keeping track of data access patterns in this manner permits the address of the prefetch request to be calculated based upon the recorded history.

FIG. 1 illustrates a prior art approach of a reference prediction table 10 organized as an instruction cache for tracking previous reference addresses and associated strides for load and store instructions. In the computer arts, a stride is defined as the difference between the addresses of the two most recent accesses with the same instruction. Reference prediction table 10 records the effective address of the operand, computes the stride for an access, and sets a state controlling the prefetching by comparing the previously recorded stride with the one most recently computed. Thus, the predicted prefetch address is based upon the past history for the same memory access instruction.

The authors of the above paper report improved performance in the case of a constant or local stride, in situations where the stride is small, and also for scalar and zero-stride memory access patterns. Unfortunately, when the memory access pattern is irregular, the mechanism illustrated in FIG. 1 produces erroneous prefetches. This is a serious problem since irregular memory access patterns appear frequently in certain types of code (e.g., pointer de-referencing). In other words, for code that exhibits irregular memory access patterns the above described hardware-based prefetching scheme is useless.

Another data prefetching mechanism that relies upon recurrence-based classification of memory access patterns is described in a paper entitled, "Quantifying the Performance Potential of the Data Prefetch Mechanism for Pointer-Intensive and Numeric Programs," by Sharad Mehrota, et al. (dated Nov. 7, 1995). This paper describes the design of a prefetching mechanism which utilizes an indirect reference buffer (IRB) organized as two mutually cooperating sub-units; a recurrence recognition unit (RRU) and a prefetch unit (PU). In operation, the PU generates a prefetch using an indirect address stride computed after signaling by the RRU.

The problem with the foregoing IRB design, however, is that when a current operand access (e.g., a load) experiences a cache miss, the PU must wait idly until data is returned to the processor before it can generate the prefetch. The reason why is because the current low target register contents are not available to compose the prefetch address.

What is needed is a new type of data prefetching mechanism that offers an alternative to ordinary stride-based prefetching and sequential prefetching policies. As will be seen, the present invention introduces the novel concept of "global stride" prefetching that is advantageous for prefetching targets of memory de-reference operations (like those that typically occur in linked lists and other types of irregular code). This new hardware data prefetching policy reduces cache miss penalty and improves effective memory access speed.

SUMMARY OF THE INVENTION

The present invention covers a method and hardware apparatus for data prefetching. In one embodiment, the method of the present invention comprises first calculating a local stride value by computing the value between two address references of a first load instruction. The local stride value of the first load instruction is used as a global stride value for address prefetching for a second load instruction, where the second load instruction is different from the first load instruction. An appropriate global stride value is added to a previous address value associated with a previous occurrence of the second load instruction, producing an address location for prefetching a block of data.

BRIEF DESCRIPTION OF THE DRAWINGS

The present invention will be understood more fully from the detailed description which follows and from the accompanying drawings, which, however, should not be taken to limit the invention to the specific embodiments shown, but rather after explanation and understanding only.

DETAILED DESCRIPTION

Figure 1:
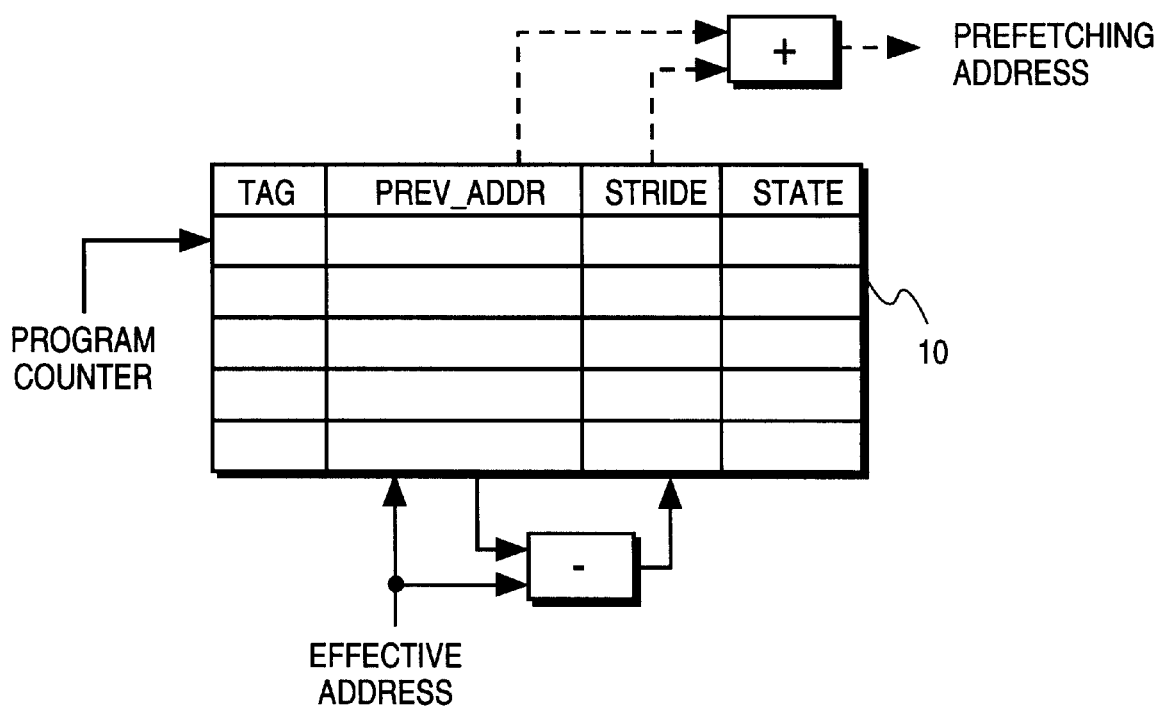
FIG. 1 illustrates a reference prediction table of a prior art prefetching scheme.

The present invention embodies a data prefetching mechanism which is based upon the novel concept of a global stride. In the following description, numerous specific details are set forth, such as memory organizations, data processing devices, microprocessor instructions, etc., in order to provide a thorough understanding of the present invention. Practitioners having ordinary skill in the computer and data processing arts will understand that the invention may be practiced without many of these specific details. In other instances, well known structures, signals, components and circuits have not been described in detail to avoid obscuring the invention.

Processor performance has increased dramatically over the last few years, but memory latency and bandwidth have progressed at a much slower pace. Therefore it is essential to reduce the effective memory access speed. To solve this problem the present invention introduces the novel concept of a global stride data prefetching policy as an alternative to traditional stride-based and sequential prefetching. The new policy of global stride prefetching eliminates many cache misses that are practically impossible to eliminate using prior art approaches.

For purposes of describing the invention, in the context of the present application a "global stride" for a given load instruction refers to the stride generated by a different load instruction. The idea of a stride (hereinafter called a "local stride") is well understood in the computer arts; it simply refers to the distance between the last two address references. Therefore, a global stride of a specific load instruction may be defined as the difference between two data references produced by a different instruction. The global stride is equivalent to the local stride for an instruction I only if the previous load instruction is the same instruction I (e.g., a loop with a single load instruction).

According to the present invention, a block of data is prefetched for an instruction based on the appropriate previous address value added with the global stride value. What this means is that to implement the global stride policy in a computer processor, one need not maintain the local stride of an instruction in a table history; rather, all that is required is to keep the previous address value of the data reference. The result is that global stride prefetching eliminates cache misses that would otherwise be impossible to eliminate using prior art prefetching policies.

It should be kept in mind that the invention is ideally suited to a computing environment where there exist irregular data structures. Note, however, that the individual elements of the irregular data structure may themselves have the same basic structure. A beneficial consequence of this property is that the invention may be used in a variety of processors, databases, or any transactional computations where there may exist long, irregular records, but wherein each one of the individual data elements of the records is identical. Thus, practitioners will appreciate that the invention is equally useful for link lists as well as more complicated structures, such as large data trees in which pointers link one record to another.

Figure 2:
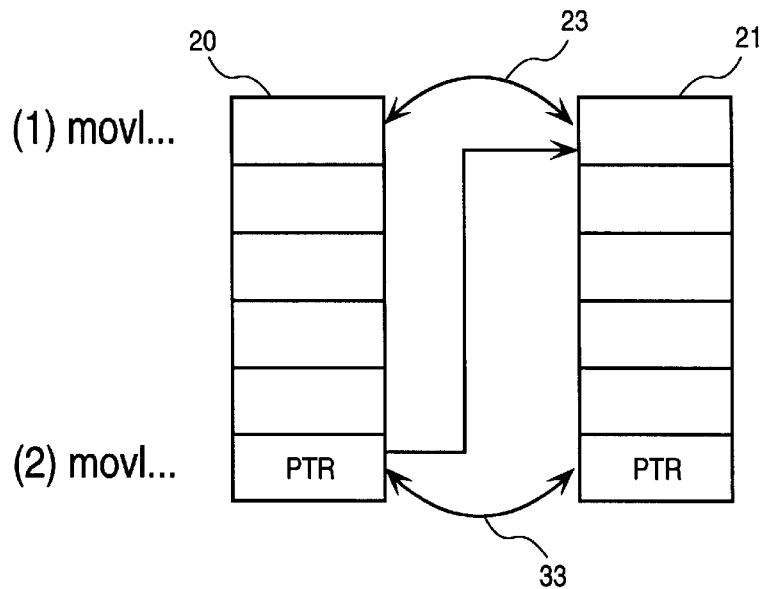
FIG. 2 illustrates the concept of global stride prefetching in a computer system according to the present invention.

Referring now to FIG. 2 there is shown a simple example illustrating the concept of global stride prefetching. Assume that we have two consecutive load instructions (e.g., move that are contained within a program loop. Each of the load instructions refers to different fields of a record in a linked list. Two records are shown: a first record 20 and a second record 21. Each of the records comprises a plurality of fields. In this example, the second load instruction is an address that points to the next field in each record in the linked list.

It should be understood that arrow 23 in FIG. 2 represents the local stride; that is the distance between the last two address references of (1) movl. The global stride of instruction (2) movl is the same value as the local stride of (1) movl, but is used to generate an address for prefetching for instruction (2) movl.

Figure 3:
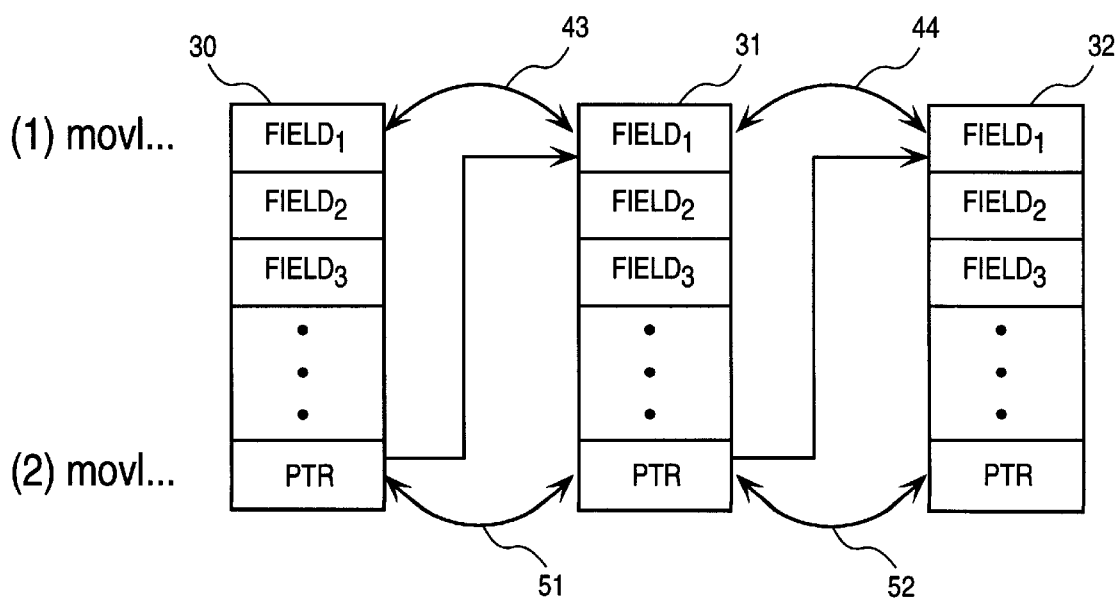
FIG. 3 illustrates pointer de-referencing operations in accordance with one embodiment of the present invention.

FIG. 3 is another illustration of the present invention. A plurality of records is shown as comprising records 30, 31, and 32. Each of these records has a plurality of fields, and includes a pointer which points to the address of the next record. The local stride between record 30 and 31 is represented by arrow 43, with the local stride between record 31 and 32 being represented by arrow 44. The global strides are represented by arrow 51 (as between records 30 and 31) and arrow 52 (as between records 31 and 32).

Note that the local stride 43 is equivalent to the local stride 44 only in the case where the data structures are regular. However, the local stride 43 is not equal to the local stride 44 when the data structures are irregular. In the latter case, the prior art method of local stride-based prefetching produces cache misses to every reference in the fields of records 31, 32, and so on. This is the problem of de-referencing which the present invention solves.

According to the present invention, prefetching is performed on a block of data utilizing the global stride. As described previously, the global strides in FIG. 3 are represent by arrows 51 and 52. When a pointer is encountered in the program, the global stride of one of the previous load instructions is utilized to perform prefetching. This information can be obtained in a variety of manners.

For example, the global stride of one of the previous load instructions that should be utilized for prefetching can easily be obtained during compilation. A simple way to make this determination is by having the compiler provide a hint. In other words, by using hints, the compiler can provide the correct information as to which one of the previous load instructions refers to a particular record. This implementation is particularly advantageous in the case where there are many load instructions in a particular loop.

Alternatively, this information can also be obtained at run-time utilizing a small queue, or similar memory, which maintains a list of the previous strides.

Figure 4:
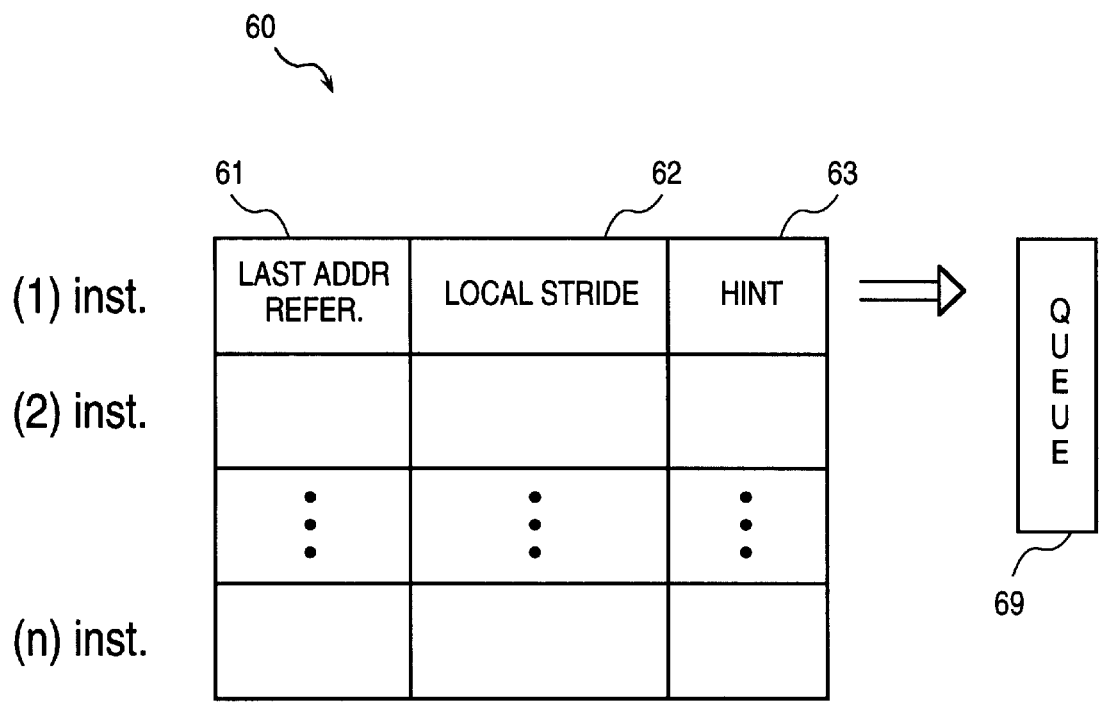
FIG. 4 illustrates a table memory utilized in one embodiment of the present invention.

FIG. 4 is an example of a table useful in an implementation of the global stride policy of the present invention. The instruction pointer-based table 60 shown in FIG. 4 keeps track of the address of the last data reference of an instruction, as shown by column 61. The table also keeps track of the local stride for each entry (i.e., column 62). The particular implementation shown in FIG. 4 also stores a hint (i.e., column 63) of where to find the relevant global stride to be used for a particular instruction. The global strides are maintained in a small queue 69. The data prefetch address may be computed by adding the appropriate global stride value to the previous address value using any one of a variety of well-known address calculation devices.

Practitioners in the art will understand that this particular implementation is applicable to large record sizes. (In the context of the present application, a large record is one in which the record size is greater than a cache line.)

It is further appreciated that the novel hardware data prefetching mechanism of the present invention can be employed in a variety of microprocessors. Essentially any processor that has a need for reducing the memory latency, not to reduce the penalty of potential cache misses, will find the advanced prefetching mechanism of the present invention especially useful.

I claim:

1. A method of data prefetching for a computer program that iteratively executes a load instruction having an associated address reference, said method comprising the steps of:

(a) calculating a global stride value as a distance between the last two address references generated by a first load instruction, wherein the global stride value is different than a local stride value;

(b) generating a prefetch address by adding said global stride value to a previous address value associated with a second load instruction different from the first load instruction;

(c) prefetching a block of data stored in a memory at said prefetch address.

2. The method of claim 1 wherein said memory comprises a cache memory associated with a data processor.

3. The method of claim 1 wherein said computer program includes a loop that refers to different fields of a record in a linked list.

4. The method of claim 3 further comprising the step of tracking pointer changes of said different fields from one record to another record in said linked list.

5. The method of claim 3 wherein said memory comprises a cache memory associated with a data processor.

6. The method of claim 5 wherein said record is larger than a line of said cache memory.

7. A method of prefetching data in the execution of a computer program that includes a loop having a pair of consecutive load instructions which refer to different fields of a record in a linked list, said method comprising the steps of:

(a) producing a table having entries associated with each of said load instructions, each entry including an address of a last data reference associated with a load instruction;

(b) storing a global stride value in a memory, said global stride value being computed as a distance between the last two address references generated by a first load instruction, wherein global stride value is different than a local stride value;

(c) prefetching data from an address location computed by adding said global stride value to said address of said last data reference contained in said table.

8. The method of claim 7 wherein said memory comprises a queue.

9. The method of claim 8 wherein each said entry of said table further includes a local stride of said load instruction.

10. The method of claim 9 wherein said queue includes a plurality of global stride values, and wherein each said entry of said table further includes a hint directed to said queue, said hint indicating which of said global stride values is to be used in step (c).

11. The method of claim 10 wherein said data is stored in a cache memory of a processor.

12. The method of claim 11 wherein said record is larger than a line of said cache memory.

13. An apparatus for prefetching data during execution of a computer program, said computer program including a loop with a pair of consecutive load instructions that refer to different fields of a record in a linked list, said apparatus comprising:

a table having entries associated with each of said load instructions, each entry including an address of a last data reference associated with a load instruction;

a memory that contains a global stride value, said global stride value being computed as a distance between the last two address references generated by a first instruction; and address calculation means for computing a prefetch address by adding said global stride value to said address of said last data reference stored in said table, wherein the global stride value is different than a local stride value.

* * * * *

UNITED STATES PATENT AND TRADEMARK OFFICE
CERTIFICATE OF CORRECTION

PATENT NO. : 6,055,622
DATED : April 25, 2000
INVENTOR(S) : Spillinger

It is certified that error appears in the above-identified patent and that said Letters Patent is hereby corrected as shown below:

On the title page item [75], replace "Illan" with --Ilan--.

Signed and Sealed this

Third Day of April, 2001

Attest:

NICHOLAS P. GODICI

*Attesting Officer*   Acting Director of the United States Patent and Trademark Office